(12) United States Patent
Jenkins et al.

(10) Patent No.: US 10,315,339 B2
(45) Date of Patent: Jun. 11, 2019

(54) SET OF MOLDING ELEMENTS AND MOLD

(71) Applicant: Compagnie Generale des Etablissements Michelin, Clermont-Ferrand (FR)

(72) Inventors: Brian William Jenkins, Greenville, SC (US); Lazar Constantin, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 59 days.

(21) Appl. No.: 15/579,493

(22) PCT Filed: Jun. 3, 2016

(86) PCT No.: PCT/US2016/035800
§ 371 (c)(1),
(2) Date: Dec. 4, 2017

(87) PCT Pub. No.: WO2016/200695
PCT Pub. Date: Dec. 15, 2016

(65) Prior Publication Data
US 2018/0147748 A1    May 31, 2018

Related U.S. Application Data

(62) Division of application No. PCT/US2015/035363, filed on Jun. 11, 2015.

(51) Int. Cl.
*B29D 30/06* (2006.01)
*B29C 33/30* (2006.01)
*B29C 33/42* (2006.01)

(52) U.S. Cl.
CPC ........ *B29C 33/302* (2013.01); *B29D 30/0606* (2013.01); *B29C 33/42* (2013.01); *B29D 2030/0613* (2013.01)

(58) Field of Classification Search
CPC ........ B29D 30/0606; B29D 2030/0613; B29C 33/302; B29C 33/42
See application file for complete search history.

(56) References Cited

U.S. PATENT DOCUMENTS

| | | | | |
|---|---|---|---|---|
| 3,553,790 A | * | 1/1971 | Brobeck et al. | B29C 33/10 425/35 |
| 3,608,602 A | * | 9/1971 | Youngblood | B60C 11/0309 152/212 |

(Continued)

FOREIGN PATENT DOCUMENTS

| | | | |
|---|---|---|---|
| DE | 1605657 | * | 3/1970 |
| JP | 3-90317 | * | 4/1991 |

(Continued)

OTHER PUBLICATIONS

European Patent Office; International Search Report and Written Opinion for patent application PCT/US2015/35363; dated Jan. 22, 2016; Publisher: European Patent Office, Rijswijk, Netherlands, pp. 1-11 enclosed.

(Continued)

*Primary Examiner* — James P Mackey
(74) *Attorney, Agent, or Firm* — Neal P. Pierotti

(57) ABSTRACT

The invention provides for a set of molding elements (4, 5) adapted to be attached in a mold for molding tires, each molding element being able to mold a cut in a tire tread, wherein the set of molding elements comprises complex shaped molding elements, each molding element being able to connect to another molding element from the set of molding elements along a generally straight interface (54) defined between connecting molding elements The invention also provides for a mold for molding tires, said mold comprising a set of molding elements as described above attached to a main cast aluminum body.

8 Claims, 3 Drawing Sheets

(56) References Cited

U.S. PATENT DOCUMENTS

| | | | | |
|---|---|---|---|---|
| 6,408,911 | B1* | 6/2002 | Tanabe | B29D 30/0606 |
| | | | | 152/209.18 |
| 9,205,613 | B2* | 12/2015 | Montbel | B29D 30/0606 |
| 2006/0257511 | A1* | 11/2006 | Iwamoto | B22F 5/007 |
| | | | | 425/35 |
| 2007/0295434 | A1* | 12/2007 | Nguyen | B29D 30/0606 |
| | | | | 152/209.18 |
| 2010/0078107 | A1* | 4/2010 | Bonhomme | B60C 11/12 |
| | | | | 152/209.25 |
| 2011/0168311 | A1 | 7/2011 | Voss | |
| 2012/0055601 | A1* | 3/2012 | Christenbury | B60C 11/12 |
| | | | | 152/209.18 |
| 2012/0168049 | A1* | 7/2012 | Jenkins | B60C 11/12 |
| | | | | 152/209.21 |
| 2013/0164401 | A1* | 6/2013 | Dusseaux | B29D 30/0606 |
| | | | | 425/28.1 |
| 2015/0273950 | A1 | 1/2015 | Martin | |

FOREIGN PATENT DOCUMENTS

| | | | |
|---|---|---|---|
| JP | 11-58386 | * | 3/1999 |
| JP | 2000-238514 | * | 9/2000 |

OTHER PUBLICATIONS

European Patent Office; International Search Report and Written Opinion for patent application PCT/US2016/3580; dated Sep. 19, 2016; Publisher: European Patent Office, Rijswijk, Netherlands, pp. 1-10 enclosed.

* cited by examiner

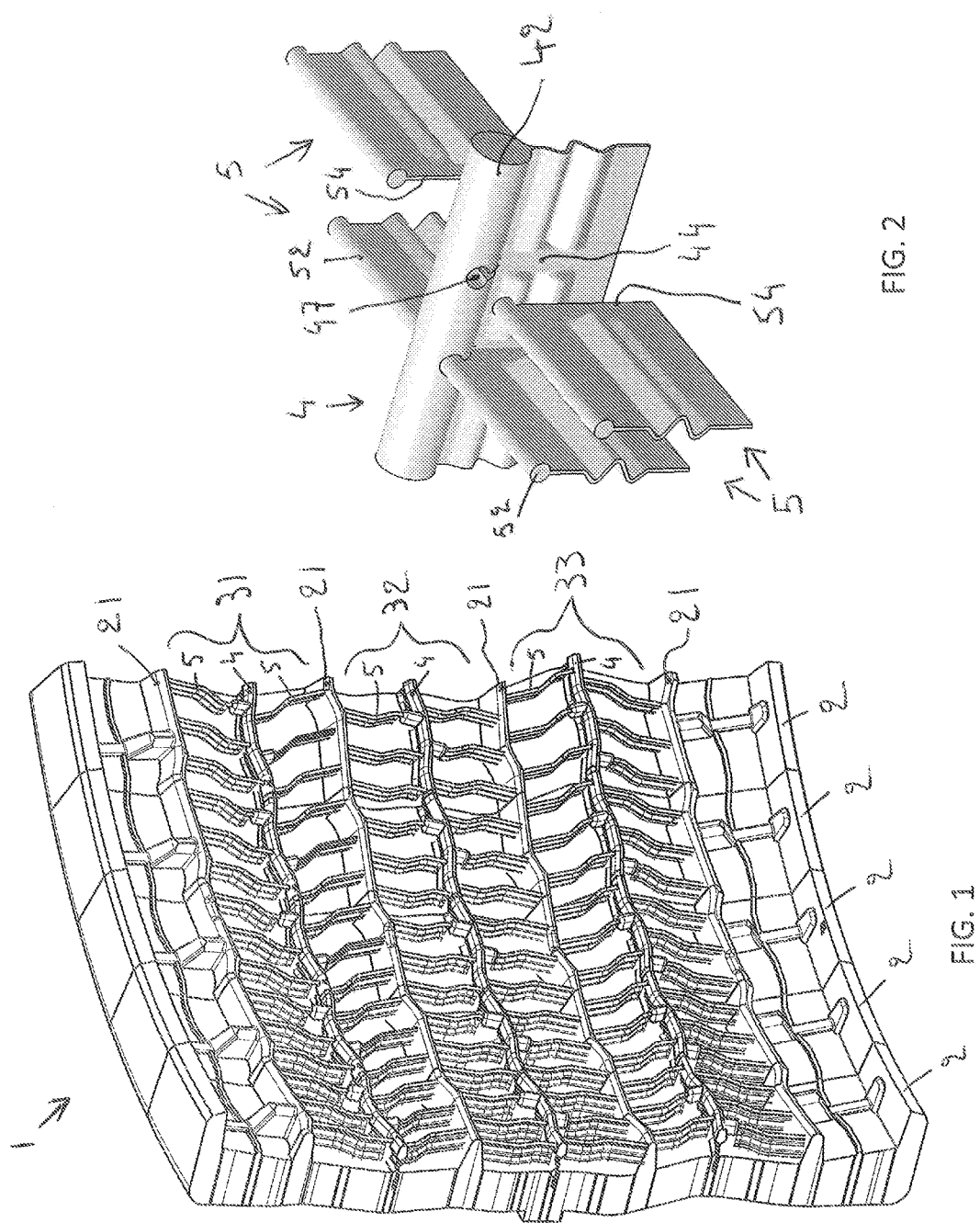

SET OF MOLDING ELEMENTS AND MOLD

CROSS-REFERENCE TO RELATED APPLICATIONS

The present application is a national stage entry of International Application Number PCT/US2016/035800 having an international filing date of Jun. 3, 2016 and which claims priority to International Application Number PCT/US2015/035363 which has an international filing date of Jun. 11, 2015. International Application Numbers PCT/US2016/035800 and PCT/US2015/035363 are incorporated by reference herein in their entireties for all purposes.

BACKGROUND OF THE INVENTION

Field of the Invention

The present invention relates to a set of molding elements for forming a network of molding elements adapted for molding cuts in a tire tread. The invention also relates to a mold including such a set of molding elements.

Description of the Related Art

Document WO2010076521 discloses a method for manufacturing a tire tread molding assembly comprising a network of molding elements in the form of blades and bars, each bar overmolding at least an edge of a blade. One step of the method consists in using wax in order to build a temporary network. The wax is later melted during the final molding step.

Document EP0868955 discloses a method for manufacturing a tire mold using laser sintering. Laser sintering allows manufacturing intricate shapes, for instance shapes that may be useful for molding tires but are impossible (or too expensive) to machine or cast.

Document US2011304082 discloses an integral network including molding elements like bars and blades, the network being manufactured by laser sintering as a single piece and then attached to a tire mold main body, for instance by screws. Such a network may be of great size as it can span across the whole tread width.

When those networks of molding elements are obtained by laser sintering as in US2011304082, they are subjected to thermal deformations and can warp and finally fall outside the acceptable manufacturing tolerances. In addition, in order to manufacture such a network, it is necessary to provide a large enough laser sintering machine having in particular a large sized bed on which to hold the network. Further, the molding elements being manufactured in the form of an integral network, if one molding element is showing a manufacturing defect, the entire network must be scrapped.

More generally in the tire industry, there is a strong tendency to create more complex tread patterns using an increasing number of undulated sipes in an effort to improve both the grip and the wear resistance performances of tires.

There is therefore a need to find a solution that makes it possible to obtain a set of complex shaped molding elements with good mechanical integrity, that conforms to the manufacturing tolerances and that is simple and practical to manufacture.

Definitions

A "tire" means any type of tire whether or not it is subjected to an internal pressure when in use.

A "tread" of a tire means a quantity of rubber material delimited by lateral surfaces and by two main surfaces, one of which is intended to come into contact with a roadway when the tire is being used on and the other of which is oriented towards the inside of the tire.

A "cut" in a tread means either a fine cut also referred to as a sipe or a wide cut also referred to as a groove.

A "molding element" means an element placed in a mold able to produce cuts in the tread of a tire.

SUMMARY OF THE INVENTION

The invention provides for a set of molding elements adapted to be attached in a mold for molding tires, each molding element being able to mold a cut in a tire tread, wherein the set of molding elements comprises complex shaped molding elements, each molding element being able to connect to another molding element from the set of molding elements along a generally straight interface defined between connecting molding elements.

In a particular embodiment, molding elements comprise undulated blades having generally straight blade edges for connection to other molding elements.

In another particular embodiment, molding elements comprise generally straight receiving zones arranged on a lateral wall of said molding elements, wherein the receiving zones are slots arranged in a protruding part from the lateral wall of the molding elements.

In another particular embodiment, the protruding parts are forming posts extending along a full molding height of the lateral wall.

In another particular embodiment, voids are arranged in a bar portion of molding elements, said voids being able to receive a bar portion from a connecting molding element.

In another particular embodiment, some or even all molding elements are obtained by a laser sintering process.

The invention provides for a mold for molding tires, said mold comprising a set of molding elements as described above attached to a main cast aluminum body.

In this way a mold comprising a network of complex molding elements can be obtained in a very effective way and be very robust in the same time.

BRIEF DESCRIPTION OF THE DRAWINGS

Further features and advantages of the invention will become apparent from the following description given by way of non-limiting example with reference to the attached drawings in which:

FIG. 1 is a perspective view of a portion of a tire mold according to an embodiment of the invention, FIG. 2 is a perspective view of a set of molding elements according to an embodiment of the invention.

DETAILED DESCRIPTION OF A PARTICULAR EMBODIMENT

Figure 3:
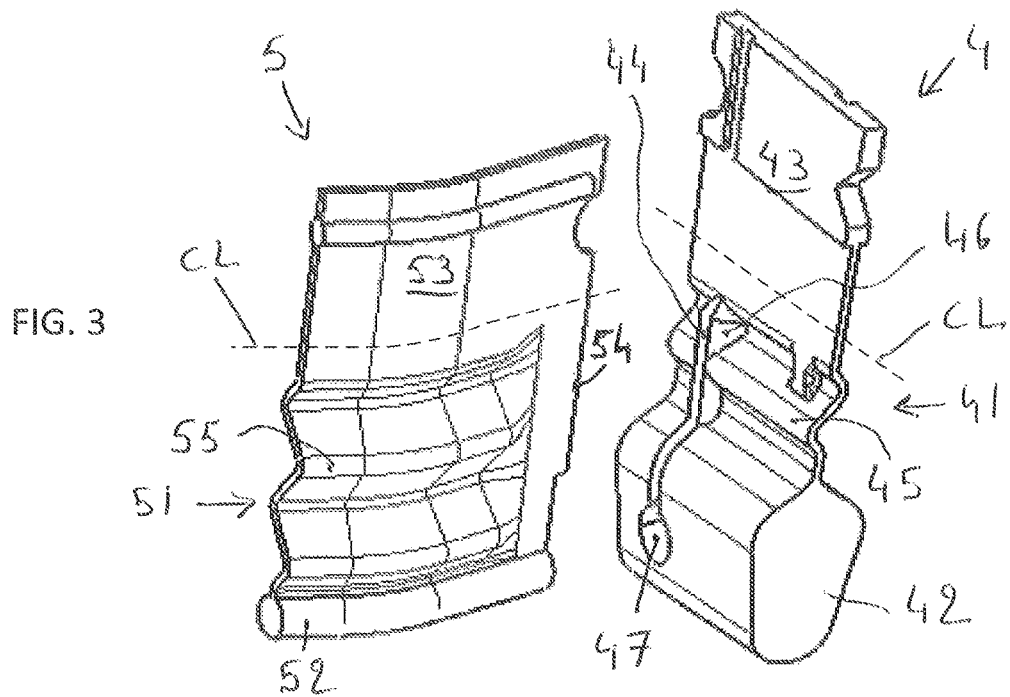
FIG. 3 is a perspective view of a set of molding elements according to another embodiment of the invention.

Reference will now be made in detail to embodiments of the invention, examples of which are illustrated in the drawings. Those examples are provided by way of explanation of the invention. In the description that follows, elements that are substantially identical or similar will be denoted by identical references.

FIG. 1 shows a portion of a tire mold 1. This portion includes five individual mold segments 2 stacked in the circumferential direction of the mold. When the mold is operated, these 5 mold segments may be held together in a common mold sector (not shown). The main body of each mold segment 2 is from cast aluminum. Each mold segment includes a number of finer molding elements that are attached to the aluminum main body to create detailed and complex features of the tire tread. There are generally circumferential molding elements 4 and generally transverse molding elements 5.

In the present embodiment there are three sets 31, 32, 33 of those molding elements. Each set is assembled from individual molding elements that connect together and are held in the cast aluminum segment main bodies. Here, the bases of all of the molding elements are buried in the main body and the edges of some of the molding elements are buried in solid cast aluminum circumferential ridges 21 that will mold main circumferential grooves in the tire tread.

Despite their small size, the molding elements must resist great forces during the molding and unmolding steps of the tire manufacturing process. The molding elements are preferably made out of steel and preferably obtained by a 3-D printing process using laser sintering.

As shown in more detail on FIG. 2, circumferential molding elements 4 and transverse molding elements 5 may combine a blade region 41 or 51 and a bar 42 or 52. As is well known in the art, blades will be molding sipes and bars will be molding hidden grooves or channels in the tire tread. Small bars like bar 52 on the transverse elements may typically be used to make the blade edges stronger and also to prevent cracks to initiate at the bottom of the tire sipes. Bigger bars like bar 42 on the circumferential elements may typically be used to mold grooves that can receive and convey water out of the tire contact patch. The connection between connecting molding elements uses a generally straight interface despite the complex shape of the molding elements.

FIG. 3 partially represents a pair of such molding elements in even greater detail and in its unassembled state, that is to say connected neither to other molding elements nor to the aluminum body of a segment 2. FIG. 3 thus shows portions of the molding elements that are simply not visible when they are in place in a mold that is ready to operate.

The left side part of FIG. 3 shows an exemplary structure of an undulated transverse molding element 5 that demonstrates how the parts may be connected. The dotted line CL illustrates the aluminum casting boundary. The portion 53 of the molding element that is above the dotted line CL is an anchoring portion that will be buried into the aluminum casting. Conversely, the portion of the molding element that is below the dotted line will be protruding from the aluminum surface of the mold. In comparison, FIG. 2 is showing only the portions that are protruding from the aluminum casting. The blade edge 54 is generally straight despite the undulations 55 of the blade. The edge is flattened and cut generally straight.

The right side part of FIG. 3 shows an exemplary structure of a circumferential element intended to be connected to the above described transverse element 5. The dotted line CL also illustrates the aluminum casting boundary. This circumferential element includes an important bar portion 42 intended to mold a hidden groove in the tire tread as better visible from FIG. 1. The bar portion 42 includes a void 47 for receiving the smaller bar portion 52 of the transverse element 5. The circumferential molding element 4 also includes longitudinal undulations 45 in its blade portion 41. A slot 44 on the lateral wall of this circumferential molding element 4 is adapted to receive the edge 54 of the transverse element 5. A generally straight interface is thus defined between the two molding elements. Because of the undulations of the blade of the circumferential element, the slot is arranged between protruding parts 46 that are provided mainly where undulations are pushing the lateral wall away from the blade edge 54.

The width of the slot is slightly greater than the thickness of the edge that will be received in this slot, so as to allow a necessary clearance for assembling the two molding elements.

Comparing again FIG. 3 and FIG. 2, it is clear that a straight interface can also be defined without a slot but more simply by having a flat receiving zone 44 arranged where the edge 54 is received.

Figure 4:
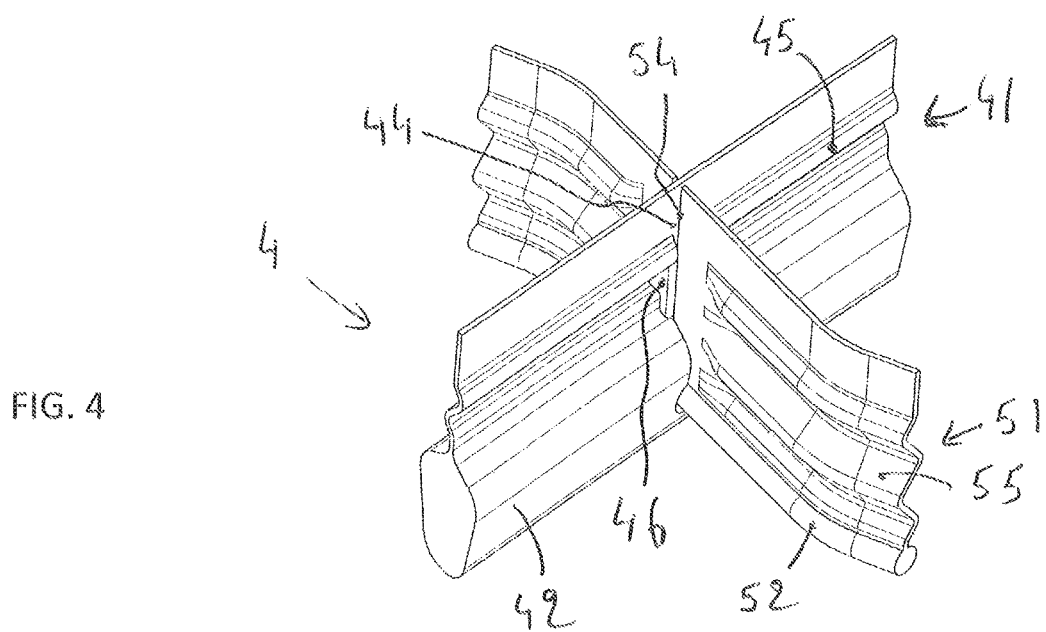
FIG. 4 is a perspective view of an assembled set of molding elements similar to FIG. 3.

FIG. 4 shows a set of molding elements in the assembled state and with their buried portions omitted. This set is similar to that of FIG. 3 except for the fact that the two transverse elements 5 are connected on each side of the circumferential element 4 at the same circumferential location instead of being offset as in FIG. 3.

Figure 5:
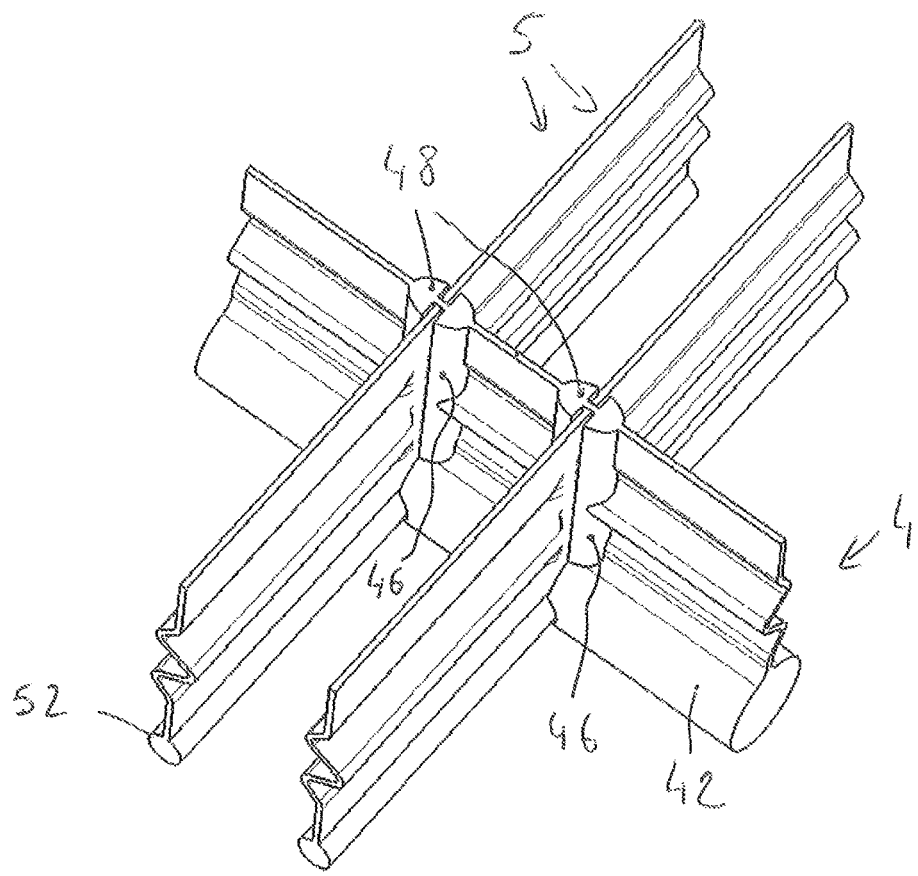
FIG. 5 is a perspective view of an assembled set of molding elements according to another embodiment.

FIG. 5 shows a set of molding elements in the assembled state. This set is similar to that of FIG. 4 except for the fact that the protruding parts 46 which house the slots 44 constitute posts 48 going up into the cast aluminum body. The posts are therefore extending along a full molding height of the lateral wall.

Figure 6:
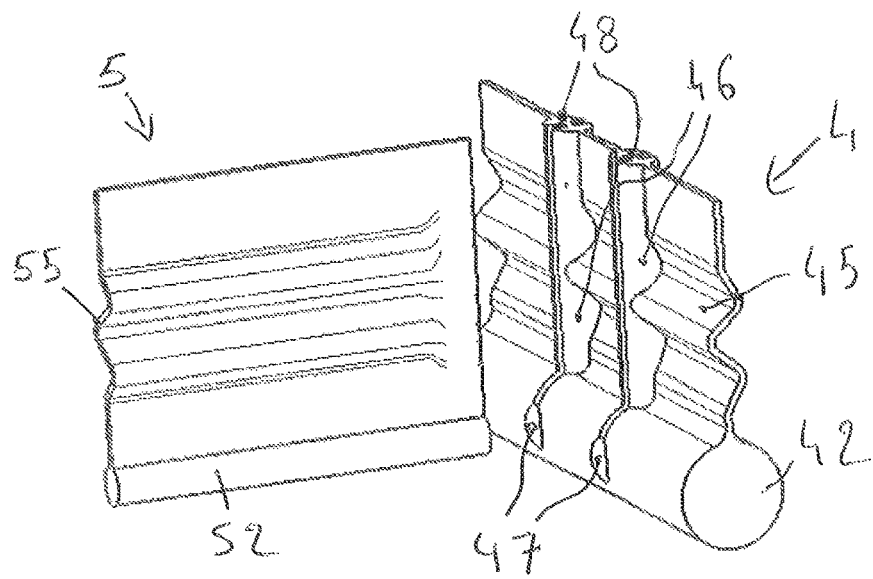
FIG. 6 is a perspective view of two molding elements according to FIG. 5 in a disassembled situation.

FIG. 6 shows two molding elements having the exact same design as in FIG. 5, the transverse elements 5 being disconnected from the side of the circumferential element 4.

The molding elements are preferably manufactured from steel in a 3-D printing process using laser sintering. Obtaining a large network by manufacturing much smaller individual molding elements allows for a much more effective laser sintering process.

As an alternative, these individual molding elements can be manufactured by any other suitable manufacturing method such as stamping, casting or machining.

The straight interface between elements allows for small relative movements that make assembling the networks more simple and less subject to warping under thermal expansion and stresses during the subsequent aluminum casting process.

What is claimed is:

1. A set of molding elements adapted to be attached in a mold for molding tires, each molding element being able to mold a cut in a tire tread, comprising:
    a circumferential molding element and a transverse molding element, the circumferential molding element being able to connect to the transverse molding element from the set of molding elements along a generally straight interface defined between the circumferential molding element and the transverse molding element;
    wherein the generally straight interface is defined on lateral walls of the circumferential and transverse molding elements;
    wherein the generally straight interface has a slot arranged in a protruding part from the lateral wall of the circumferential molding element.

2. A set of molding elements according to claim 1, wherein the set of molding elements having the transverse molding element that comprises an undulated blade having a generally straight blade edge for connection to the circumferential molding element.

3. A set of molding elements according to claim 1 wherein the protruding part is a forming post extending along a full molding height of the lateral wall of the circumferential molding element.

4. A set of molding elements according to claim 1, wherein the set of molding elements having the circumferential molding element and the transverse molding element obtained by a laser sintering process.

5. A set of molding elements according to claim 4 wherein all molding elements are obtained by a laser sintering process.

6. A mold for molding tires, said mold comprising a set of molding elements according to claim 1 attached to a main cast aluminum body.

7. A set of molding elements adapted to be attached in a mold for molding tires, each molding element being able to mold a cut in a tire tread, comprising:
    a circumferential molding element and a transverse molding element, the circumferential molding element being able to connect to the transverse molding element from the set of molding elements along a generally straight interface defined between the circumferential molding element and the transverse molding element,
    wherein the circumferential molding element having a void arranged in a bar portion of the circumferential molding element, said void being able to receive a bar portion from the transverse molding element in connecting the circumferential molding element and the transverse molding element.

8. A set of molding elements adapted to be attached in a mold for molding tires, comprising a plurality of molding elements that have a circumferential molding element and a transverse molding element each able to mold a cut in a tire tread, wherein the circumferential molding element and the transverse molding element being able to connect to one another along a generally straight interface defined between the circumferential molding element and the transverse molding element,
    wherein the generally straight interface is arranged on lateral walls of the circumferential and transverse molding elements and is a slot in the lateral wall of the circumferential element and an edge of the lateral wall of the transverse molding element received by the slot.

\* \* \* \* \*